(12) United States Patent
Kim et al.

(10) Patent No.: US 9,442,244 B2
(45) Date of Patent: *Sep. 13, 2016

(54) LIQUID CRYSTAL DISPLAY

(71) Applicant: SAMSUNG DISPLAY CO., LTD, Yongin, Gyeonggi-Do (KR)

(72) Inventors: Joo-Young Kim, Asan-si (KR); Hyun-Chul Bae, Cheonan-si (KR); Jae-Chang Choi, Yongin-si (KR); Seong-Sik Choi, Seoul (KR)

(73) Assignee: Samsung Display Co., Ltd. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/684,733

(22) Filed: Apr. 13, 2015

(65) Prior Publication Data

US 2015/0212259 A1    Jul. 30, 2015

Related U.S. Application Data

(63) Continuation of application No. 12/768,612, filed on Apr. 27, 2010, now Pat. No. 9,030,621.

(30) Foreign Application Priority Data

May 1, 2009   (KR) .................. 10-2009-0038739

(51) Int. Cl.
  *G02F 1/1335*  (2006.01)
  *G02F 1/1333*  (2006.01)
  *F21V 8/00*  (2006.01)

(52) U.S. Cl.
  CPC ............. *G02B 6/0085* (2013.01); *G02B 6/009* (2013.01); *G02B 6/0068* (2013.01); *G02B 6/0073* (2013.01); *G02F 1/133603* (2013.01); *G02F 2001/133314* (2013.01); *G02F 2001/133628* (2013.01)

(58) Field of Classification Search
  CPC combination set(s) only.
  See application file for complete search history.

(56) References Cited

U.S. PATENT DOCUMENTS

| 6,697,130 | B2 | 2/2004 | Weindorf et al. |
| 2003/0223020 | A1 | 12/2003 | Lee |
| 2008/0266905 | A1 | 10/2008 | Yeh |
| 2009/0128732 | A1 | 5/2009 | Hamada |
| 2009/0290088 | A1 | 11/2009 | Kwak |
| 2009/0316064 | A1 | 12/2009 | Kono et al. |

FOREIGN PATENT DOCUMENTS

| JP | 05-66390 | 3/1993 |
| JP | 09-138387 | 5/1997 |
| JP | 11-84351 | 3/1999 |
| JP | 11-86623 A | 3/1999 |
| JP | 2001-75093 A | 3/2001 |
| JP | 2002-40424 | 2/2002 |
| JP | 2003-68125 A | 3/2003 |
| JP | 2004-302048 A | 10/2004 |

(Continued)

*Primary Examiner* — Wen-Ying P Chen
(74) *Attorney, Agent, or Firm* — Innovation Counsel LLP

(57) ABSTRACT

Provided is a liquid crystal display (LCD) with improved heat dissipation and reduced thickness. The LCD includes for an embodiment: a lower housing; a heat-dissipating member which is disposed in the lower housing; a plurality of point light sources which are disposed on the heat-dissipating member; a plurality of electric wires which supply power to the point light sources; and a light guide plate (LGP) which is disposed in the lower housing in such a way that side surfaces of the LGP face the point light sources.

15 Claims, 14 Drawing Sheets

(56) References Cited

FOREIGN PATENT DOCUMENTS

| | | |
|---|---|---|
| JP | 2005-4200 A | 1/2005 |
| JP | 2005-353498 | 12/2005 |
| JP | 2006-267936 | 10/2006 |
| JP | 2007-53014 A | 3/2007 |
| JP | 2007-279480 | 10/2007 |
| JP | 2008-158268 | 7/2008 |
| JP | 2008-165101 | 7/2008 |
| KR | 10-2004-0108327 A | 12/2004 |
| KR | 10-2005-0031226 A | 4/2005 |
| KR | 10-2006-0089437 A | 8/2006 |
| KR | 10-2007-0068115 A | 6/2007 |
| KR | 1020070096340 A | 10/2007 |
| WO | 2007-129419 | 11/2007 |

LIQUID CRYSTAL DISPLAY

CROSS-REFERENCE TO RELATED APPLICATION

This application is a continuation application of U.S. patent application Ser. No. 12/768,612 filed on Apr. 27, 2010, which claims priority to Korean Patent Application No. 10-2009-0038739 filed on May 1, 2009 in the Korean Intellectual Property Office (KIPO), and all the benefits accruing therefrom under 35 U.S.C. §119, the contents of the prior applications being herein incorporated by reference.

BACKGROUND

1. Technical Field

The present invention relates to a liquid crystal display (LCD), and more particularly, to an LCD that may provide improved heat dissipation and reduced thickness.

2. Description of the Related Art

Liquid crystal displays (LCDs) are one of the most widely used types of flat panel displays. Generally, an LCD includes a pair of substrates and a liquid crystal layer interposed between the substrates. At least one of the substrate includes electrodes. In an LCD, voltages are applied to the electrodes to generate an electric field. Accordingly, the alignment of liquid crystal molecules of a liquid crystal layer is determined, and polarization of incident light is controlled. As a result, a desired image is displayed on the LCD.

An LCD, which is a passive light-emitting device, includes a liquid crystal panel that displays an image and a backlight assembly that provides light to the liquid crystal panel. Backlight assemblies are classified into direct-type backlight assemblies and edge-type backlight assemblies according to the position of light sources.

Recently, LCDs are increasingly required to become more compact, lighter, and have better color reproducibility. Accordingly, research is being conducted to use point light sources, such as light-emitting diodes (LEDs), as light sources of a backlight assembly.

When point light sources, such as LEDs, are used as light sources of a backlight assembly, heat generated by the point light sources must be removed efficiently. In addition, the structure of each part of an LCD must be changed to make the LCD more compact and lighter.

SUMMARY

Embodiments of the present invention provide a liquid crystal display (LCD) with improved heat dissipation and reduced thickness.

However, embodiments of the present invention are not restricted to the one set forth herein. The above and other embodiments of the present invention will become more apparent to one of ordinary skill in the art to which the present invention pertains by referencing the detailed description of embodiments of the present invention given below.

According to an embodiment of the present invention, there is provided an LCD including: a lower housing; a heat-dissipating member which is disposed in the lower housing; a plurality of point light sources which are disposed on the heat-dissipating member; a plurality of electric wires which supply power to the point light sources; and a light guide plate (LGP) which is disposed in the lower housing in such a way that side surfaces of the LGP face the point light sources.

BRIEF DESCRIPTION OF THE DRAWINGS

The above and other aspects and features of the present invention will become more apparent by describing in detail exemplary embodiments thereof with reference to the attached drawings, in which.

DETAILED DESCRIPTION

Figure 1:
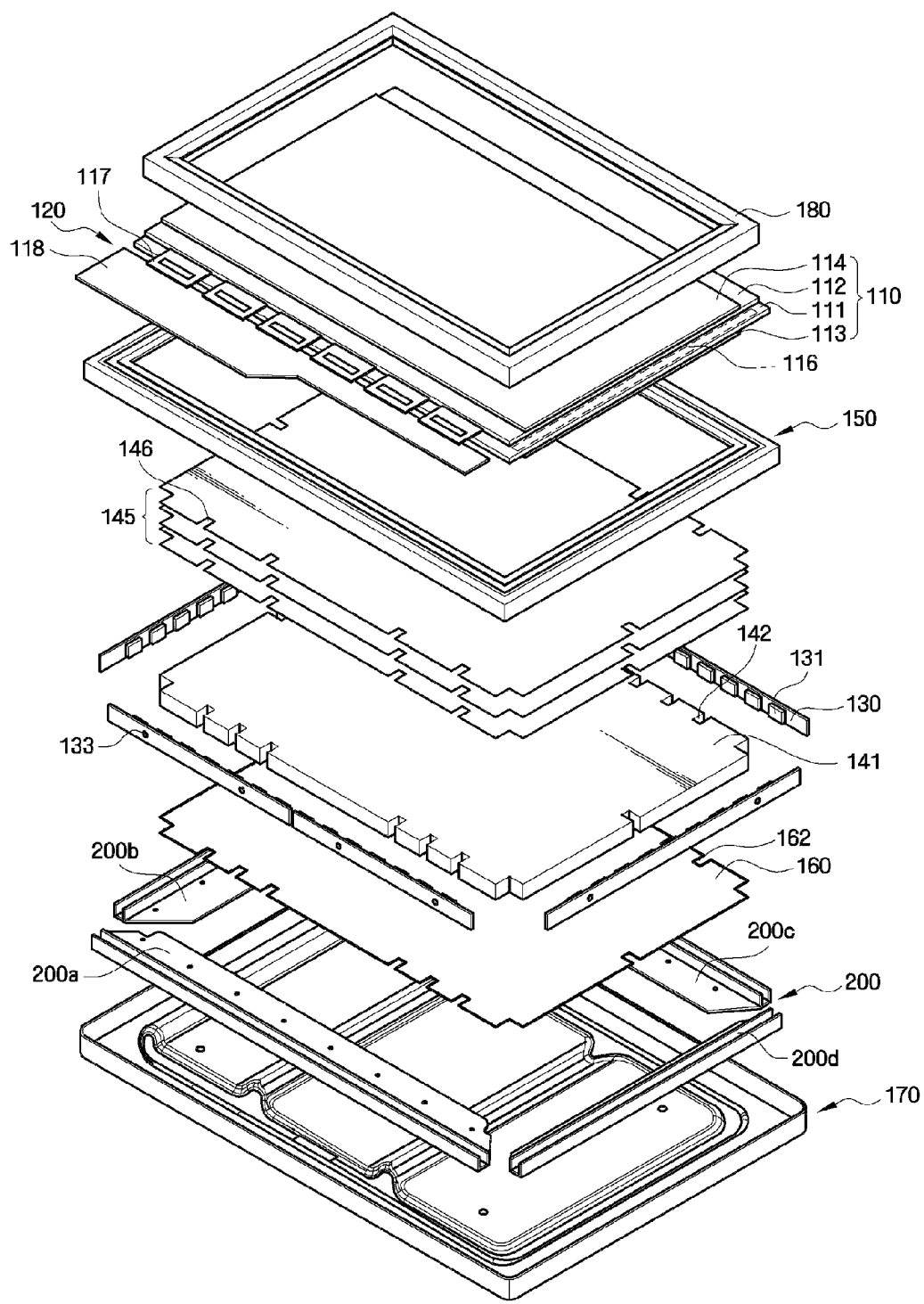
FIG. 1 is an exploded perspective view of a liquid crystal display (LCD) according to a first exemplary embodiment of the present invention.

Advantages and features of embodiments of the present invention and methods of accomplishing the same may be understood more readily by reference to the following detailed description of exemplary embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. In the drawings, sizes and relative sizes of the layers and regions are exaggerated for clarity.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. Like numbers refer to like elements throughout. As used herein, the term "and/or" includes any and all combinations of one or more of the associated listed items.

Spatially relative terms, such as "below," "beneath," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated components, steps, operations, and/or elements, but do not preclude the presence or addition of one or more other components, steps, operations, elements, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, a liquid crystal display (LCD) according to a first exemplary embodiment of the present invention will be described in detail with reference to FIGS. 1 through 11. FIG. 1 is an exploded perspective view of the LCD according to the first exemplary embodiment of the present invention.

Referring to FIG. 1, the LCD broadly includes a liquid crystal panel assembly 120 and a backlight assembly.

The liquid crystal panel assembly 120 includes a liquid crystal panel 110, liquid crystals (not shown), a gate-driving integrated circuit (IC) 116, a data tape carrier package 117, and a printed circuit board (PCB) 118. The liquid crystal panel 110 includes a first substrate 111, a second substrate 112, and polarizers 113 and 114 disposed on surfaces of the first and second substrates 111 and 112.

Specifically, the liquid crystal panel 110 includes the first substrate 111, the second substrate 112 facing the first substrate 111, the polarizer 113 disposed under the first substrate 111, and the polarizer 114 disposed on the second substrate 112. The first substrate 111 includes gate lines (not shown), data lines (not shown) and pixel electrodes, and the second substrate 112 includes a black matrix, color filters, and a common electrode. The color filters and the common electrode may also be formed on the first substrate 111, depending on the type of the liquid crystal panel 110.

The liquid crystal panel 110 having the above flat plate-shaped substrates stacked is placed on an intermediate housing 150, which will be described later.

The gate-driving IC 116 is integrated on the first substrate 111 and connected to each gate line (not shown). The data tape carrier package 117 is connected to each data line (not shown) formed on the first substrate 111.

Various driving parts may be mounted on the PCB 118. The driving parts may process a gate-driving signal and a data-driving signal and transmit the processed gate-driving signal to the gate-driving IC 116 and the processed data-driving signal to the data tape carrier package 117.

The backlight assembly broadly includes alignment boards 130 on each of which a plurality of point light sources 131 are mounted, a light guide plate (LGP) 141, one or more optical sheets 145, the intermediate housing 150, a reflective sheet 160, a lower housing 170, and a heat-dissipating member 200.

The point light sources 131 according to the present embodiment may be arranged on the alignment boards 130 which are placed along edges of the LCD. When the lower housing 170, which will be described later, is square, the point light sources 131 may be placed on all of four sides of the lower housing 170. However, the present invention is not limited thereto. That is, the point light sources 131 may also be placed on any one or two sides of the lower housing 170.

The LGP 141 is housed in the lower housing 170 such that side surfaces of the LGP 141 face the point light sources 131. When the point light sources 131 are placed on all of the four sides of the lower housing 170, light from the point light sources 131 goes into the LGP 141 through the four side surfaces of the LGP 141. The point light sources 131 may also be placed to face only two opposite side surfaces of the LGP 141.

The LGP 141 may be shaped like a plate or a sheet. One or more LGP movement-preventing grooves 142 may be formed in edges of the LGP 141 to prevent the movement of the LGP 141. The LGP movement-preventing grooves 142 couple the LGP 141 to the lower housing 170. The coupling relationship between the LGP 141 and the lower housing 170 will be described in detail later.

In order to efficiently guide light, the LGP 141 may be made of a light-transmitting material such as acrylic resin (e.g., polymethyl methacrylate (PMMA)) or polycarbonate (PC).

Light incident upon a side surface of the LGP 141, which is made of the above material, has an angle less than a critical angle of the LGP 141. Thus, the light is input to the LGP 141. In contrast, when light is incident upon an upper or lower surface of the LGP 141, an angle of incidence of the light is greater than the critical angle of the LGP 141. Thus, the light does not exit from the LGP 141. Instead, the light is evenly delivered within the LGP 141.

A pattern may be formed on at least one surface of the LGP 141. For example, a diffusion pattern (not shown) may be formed on the lower surface of the LGP 141 such that guided light can come out of the LGP 141 in an upward direction.

The optical sheets 145 are disposed on the upper surface of the LGP 141 and diffuse and concentrate light that is received from the LGP 141. The optical sheets 145 may include a diffusion sheet, a prism sheet, and a protective sheet. Of the optical sheets, the diffusion sheet may be located closest to the LGP 141. The diffusion sheet may diffuse light, which is received from the LGP 141, and thus prevent the light from being concentrated in a specific area. The prism sheet may have a predetermined array of triangular prisms on a surface thereof. The prism sheet may be disposed on the diffusion sheet and concentrate light, which is diffused by the diffusion sheet, in a direction perpendicular to the liquid crystal panel 110. The protective sheet may be disposed on the prism sheet and protect an upper surface of the prism sheet. In addition, the protective sheet may diffuse light for uniform distribution of the light.

One or more optical sheet movement-preventing grooves 146 may be formed in edges of the optical sheets 145 to prevent the movement of the optical sheets 145. The optical sheet movement-preventing grooves 145 may couple the optical sheets 145 to the lower housing 170. The coupling relationship between the optical sheets 145 and the lower housing 170 will be described in detail later.

The intermediate housing 150 may be shaped like a frame whose outer edges correspond respectively to sidewalls 171 (see FIG. 9) of the lower housing 170.

The intermediate housing 150 may be coupled to the lower housing 170 by coupling members formed in sidewalls of the intermediate housing 150. A mounting portion may be formed at an upper portion of the intermediate housing 150 and may support the liquid crystal panel 110.

The liquid crystal panel 110 is separated from the optical sheets 145 by the mounting portion of the intermediate housing 150.

The intermediate housing 150 may be a mold frame made of, e.g., a plastic material, in order to prevent parts fixed in position by the intermediate housing 150 from being damaged.

To be reflective, the reflective sheet 160 may be made of, e.g., polyethylene terephthalate (PET). In addition, a diffusion layer containing, e.g., titanium dioxide, may be coated on a surface of the reflective sheet 160. The reflective sheet 160 may also be made of metal such as silver (Ag).

The reflective sheet 160 is disposed between the LGP 141 and the heat-dissipating member 200 and reflects light, which is output downward from the lower surface of the LGP 141, in an upward direction. Specifically, the reflective sheet 160 reflects light, which has not been reflected by a micro-dot pattern formed on the lower surface of the LGP 141, toward an exit surface of the LGP 141, thereby reducing light loss.

Reflective sheet movement-preventing grooves 162 may be formed in edges of the reflective sheet 160 to prevent the movement of the reflective sheet 160. The reflective sheet movement-preventing grooves 160 couple the reflective sheet 160 to the lower housing 170. The coupling relationship between the reflective sheet 160 and the lower housing 170 will be described in detail later.

The lower housing 170 may be made of a rigid metal material such as stainless steel. The lower housing 170 according to the present embodiment is designed to add rigidity to the LCD and reduce a thickness of the LCD, which will be described in detail later.

The heat-dissipating member 200 is placed in the lower housing 170 and dissipates heat generated by the point light sources 131 to the outside. The heat-dissipating member 200 will be described in detail later.

An upper housing 180 may be disposed on the liquid crystal panel 110 to cover an upper surface of the liquid crystal panel 110 housed in the lower housing 170 and may be coupled to the lower housing 170. A window is formed in an upper surface of the upper housing 180 such that the liquid crystal panel 110 is at least partially uncovered by the upper housing 180.

The upper housing 180 may be coupled to the lower housing 170 by hooks (not shown) and/or screws (not shown). The upper housing 180 and the lower housing 170 may also be coupled to each other in various ways.

Figure 2:
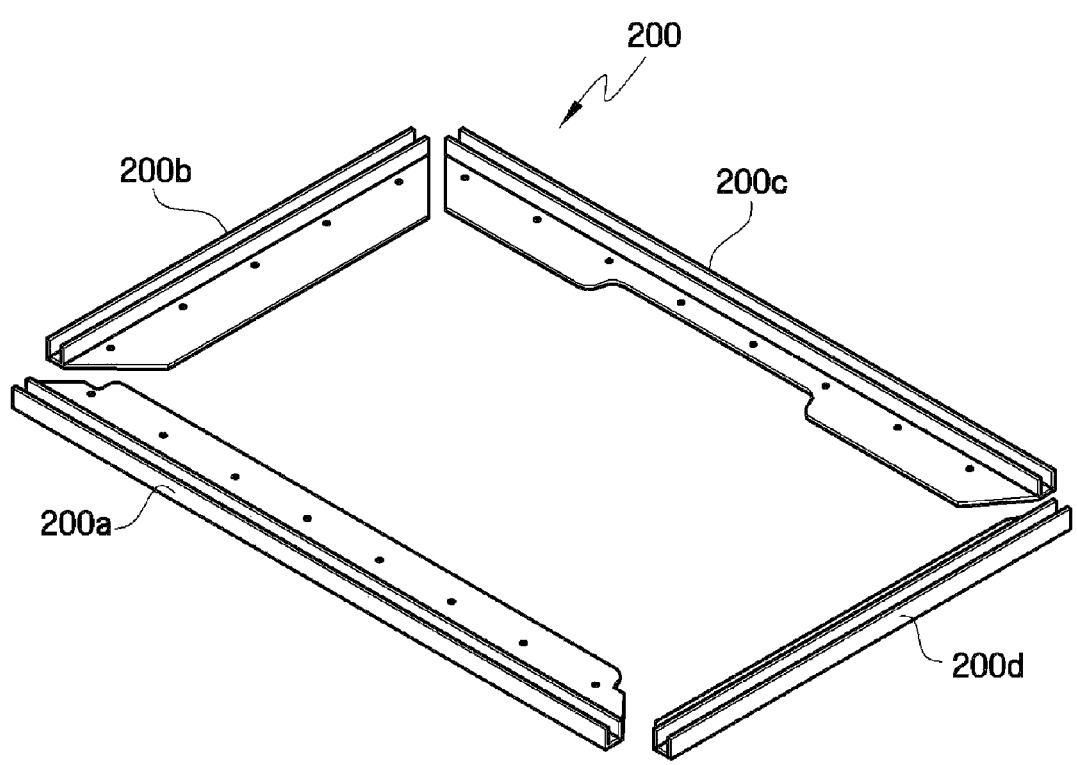
FIG. 2 is a perspective view of a heat-dissipating member according to the first exemplary embodiment of the present invention.
Figure 3:
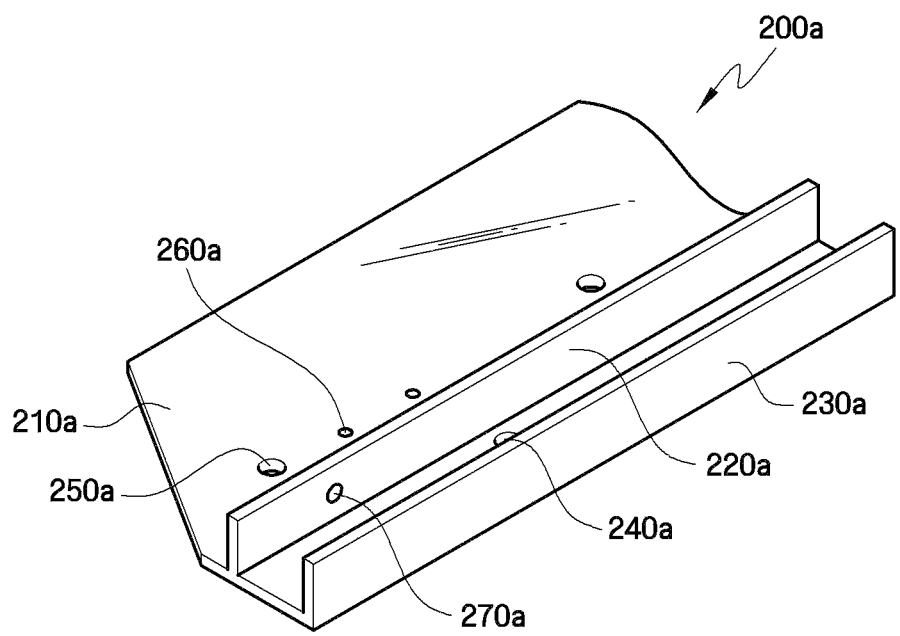
FIG. 3 is a partial perspective view of the heat-dissipating member according to the first exemplary embodiment of the present invention.
Figure 4:
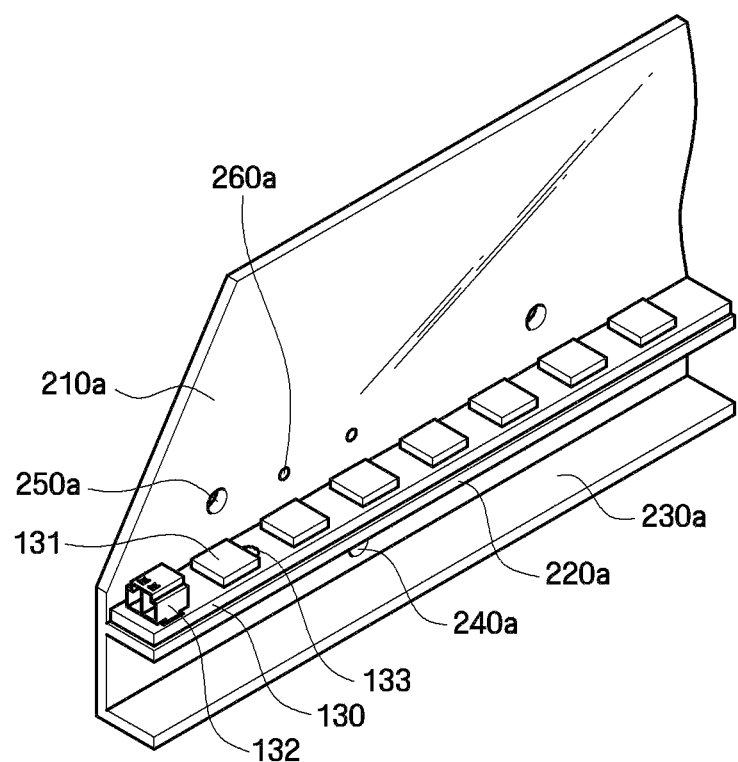
FIG. 4 is a perspective view showing the arrangement relationship between the heat-dissipating member and point light sources according to the first exemplary embodiment of the present invention.
Figure 5:
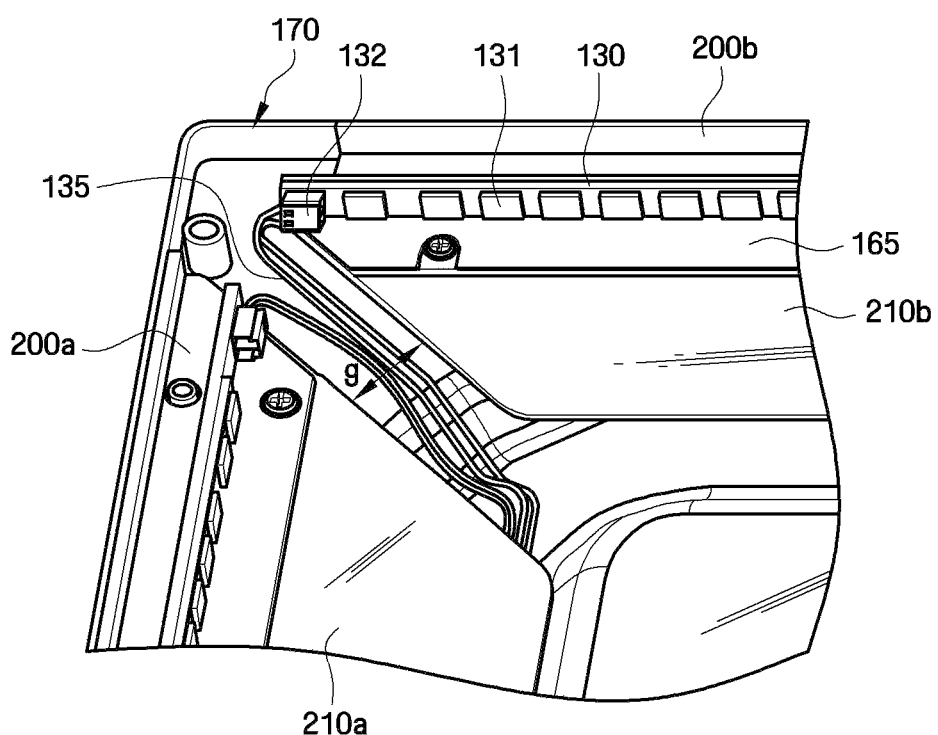
FIG. 5 is a perspective view showing the arrangement relationship between the heat-dissipating member and electrical wires according to the first exemplary embodiment of the present invention.
Figure 6:
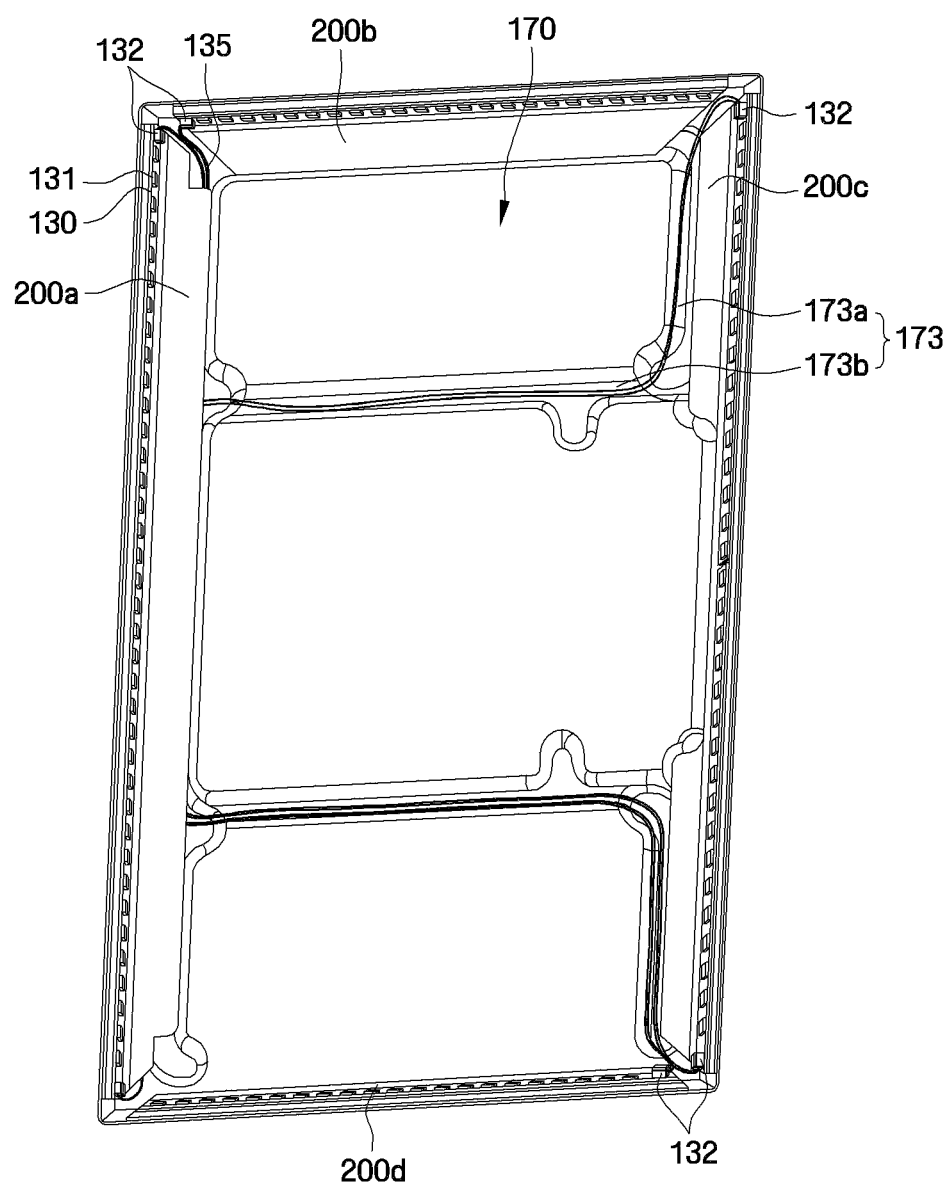
FIG. 6 is a schematic view showing the arrangement relationship between the heat-dissipating member and a lower housing according to the first exemplary embodiment of the present invention.

Hereinafter, the arrangement relationship between the heat-dissipating member 200 and the point light sources 131 will be described in detail with reference to FIGS. 2 through 6. FIG. 2 is a perspective view of the heat-dissipating member 200 according to the first exemplary embodiment of the present invention. FIG. 3 is a partial perspective view of the heat-dissipating member 200 according to the first exemplary embodiment of the present invention. FIG. 4 is a perspective view showing the arrangement relationship between the heat-dissipating member 200 and the point light sources 131 according to the first exemplary embodiment of the present invention. FIG. 5 is a perspective view showing the arrangement relationship between the heat-dissipating member 200 and electrical wires 135 according to the first exemplary embodiment of the present invention. FIG. 6 is a schematic view showing the arrangement relationship between the heat-dissipating member 200 and the lower housing 170 according to the first exemplary embodiment of the present invention.

Referring to FIGS. 1 and 2, the heat-dissipating member 200 according to the present embodiment is a partitioned heat-dissipating member that includes a plurality of unit heat-dissipating members 200a through 200d.

The heat-dissipating member 200 may be made of thermally conductive aluminum and dissipate heat generated by the point light sources 131 to the outside.

Referring to FIGS. 2 through 4, each of the unit heat-dissipating members 200a through 200d includes a heat-dissipating plate and a heat-dissipating support wall which is formed substantially perpendicular to the heat-dissipating plate. Hereinafter, a heat-dissipating plate 210a and a heat-dissipating support wall 220a of the unit heat-dissipating member 200a will be described as an example.

Widths of the unit heat-dissipating members 200a through 200d may be partially different as shown in FIG. 2 or may be equal unlike what is shown in FIG. 2.

Figure 9:
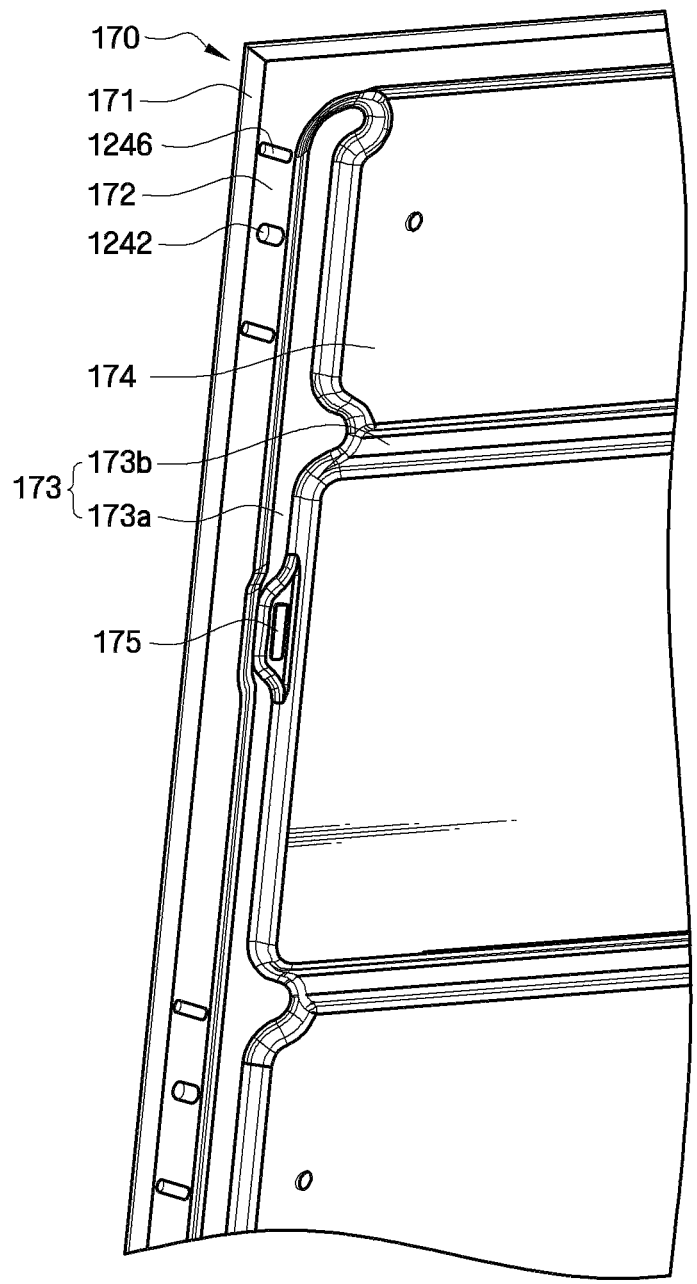
FIG. 9 is a partial perspective view of the lower housing according to the first exemplary embodiment of the present invention.

The heat-dissipating plate 210a is disposed parallel to a floor 172 (see FIG. 9) of the lower housing 170 (see FIG. 9). Specifically, a lower surface of the heat-dissipating plate 210a may be closely attached to an upper surface of the floor 172 of the lower housing 170.

The heat-dissipating plate 210a is plate-shaped and thus minimizes an increase in the thickness of the LCD. In addition, the heat-dissipating plate 210a is shaped like a trapezoid with two non-parallel sides. Accordingly, the unit heat-dissipating members 200a through 200d do not overlap each other and thus are separated from each other.

The larger the area of the heat-dissipating plate 210a, the greater the heat-dissipating efficiency of a heat-dissipating member 200. Thus, the area of the heat-dissipating plate 210a is adjusted in view of the efficiency of heat dissipation and the weight of the LCD.

The heat-dissipating support wall 220a extends from the heat-dissipating plate 210a in a direction substantially perpendicular to the heat-dissipating plate 210a.

The point light sources 131 are disposed on the heat-dissipating support wall 220a. Specifically, the point light sources 131 are mounted parallel to each other on a surface of each of the alignment boards 130, and the other surface of each of the alignment boards 130 is closely attached to the heat-dissipating support wall 220a. Since each of the alignment boards 130 has alignment board-coupling holes 133, it can be coupled to the heat-dissipating support wall 220a by coupling members such as screws. Coupling holes 270a corresponding respectively to the alignment board-coupling holes 133 are formed in the heat-dissipating support wall 220a.

Referring to FIG. 4, each of the alignment boards 130 may be shaped like a rectangular plate. Alternatively, although not shown in the drawings, each of the alignment boards 130 may be bent in an "L" shape. In the latter case, each of the alignment boards 130 includes a first portion which is placed on the heat-dissipating plate 210a and a second portion which extends from the first portion to be substantially perpendicular to the first portion and is closely attached to the heat-dissipating support wall 220a.

Each of the alignment boards 130 may have a circuit pattern (not shown) which connects the point light sources 131 to each other. A connector 132 may be formed at an end of each of the alignment boards 130 to supply power to the point light sources 131. Each of the alignment boards 130 may be made of a thermally conductive material to maximize the dissipation of heat generated by the point light sources 131. A heat-dissipating member sidewall 230a may further be formed at an edge of the heat-dissipating plate 210a. The heat-dissipating member sidewall 230a may be disposed parallel to the heat-dissipating support wall 220a and supported by a corresponding one of the sidewalls 171 (see FIG. 9) of the lower housing 170 (see FIG. 9). The heat-dissipating member sidewall 230a and the heat-dissipating support wall 220a enhance rigidity of the backlight assembly, for example, prevent distortion of the backlight assembly. A rib of the intermediate housing 150 (see FIG. 1) may be placed in a space between the heat-dissipating member sidewall 230a and the heat-dissipating support wall 220a. The space between the heat-dissipating member sidewall 230a and the heat-dissipating support wall 220a serves as an air passage, thereby enhancing the heat dissipation function of a heat-dissipating member 200.

Heat-dissipating plate fixing grooves 240a and 250a may be formed in the heat-dissipating plate 210a to fix the unit heat-dissipating member 200a to the lower housing 170 (see FIG. 9).

In addition, protrusion through holes 260a may be formed in the heat-dissipating plate 210a, and optical sheet movement-preventing protrusions 1246 (see FIG. 9) or LGP movement-preventing protrusions 1242 (see FIG. 9), which will be described later, pass through the protrusion through holes 260a.

The arrangement relationship between the heat-dissipating member 200 and the electric wires 135 will now be described in detail with reference to FIGS. 5 and 6. FIG. 5 is a perspective view showing the arrangement relationship between the heat-dissipating member 200 and the electric wires 135 according to the first exemplary embodiment of the present invention. FIG. 6 is a perspective view showing the arrangement relationship between the heat-dissipating member 200 and the lower housing 170 according to the first exemplary embodiment of the present invention.

Referring to FIGS. 5 and 6, a second reflective sheet 165 may be disposed on each heat-dissipating plate (210a or 210b in FIG. 5) and along each of the alignment boards 130.

The second reflective sheet 165 may overlap each edge of the reflective sheet 160 (see FIG. 1) and thus prevent leakage of light between the point light sources 131 and other optical parts.

The electric wires 135, which supply power to the point light sources 131, are connected to the connector 132. The electric wires 135 are placed in a gap "g" between the unit heat-dissipating members 200a and 220d. The gap "g" may be greater than the sum of diameters of the electric wires 135 placed in the gap "g." Accordingly, there is no need to increase the thickness of the LCD in order to secure the space for the electric wires 135. Consequently, the thickness of the LCD can be reduced.

Referring to FIG. 6, the electric wires 135 extend through a concave embossed portion 173 and are drawn out from a rear surface of the lower housing 170 through an electric wire outlet hole 175 (see FIG. 9). Accordingly, no separate space is required for the electric wires 135, thereby reducing the thickness of the LCD.

Figure 7:
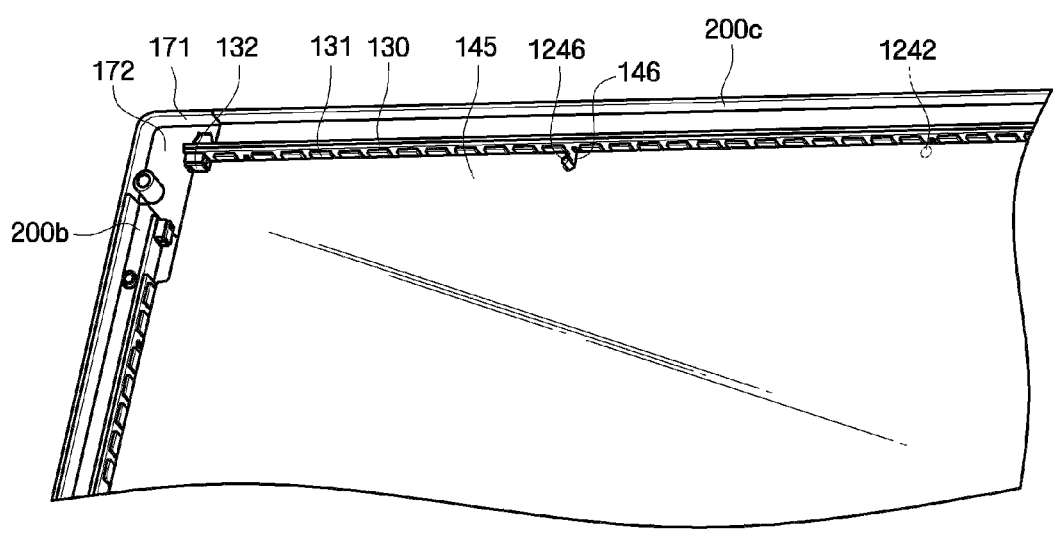
FIG. 7 is a perspective view showing the coupling relationship between optical sheets and the lower housing according to the first exemplary embodiment of the present invention.
Figure 8:
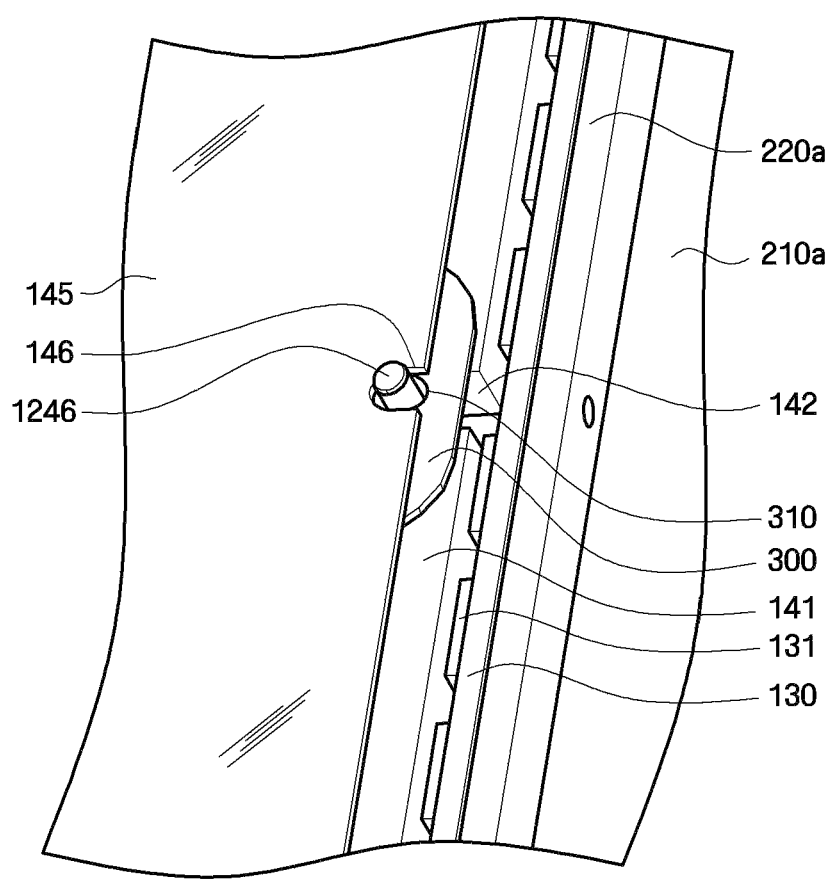
FIG. 8 is a perspective view showing the coupling relationship between the lower housing and the optical sheets and a light guide plate (LGP) according to the first exemplary embodiment of the present invention.

The coupling relationship between the lower housing 170 and the LGP 141 or the optical sheets 145 will now be described in detail with reference to FIGS. 7 through 9. FIG. 7 is a perspective view showing the coupling relationship between the optical sheets 145 and the lower housing 170 according to the first exemplary embodiment of the present invention. FIG. 8 is a perspective view showing the coupling relationship between the lower housing 170 and the optical sheets 145 and the LGP 141 according to the first exemplary embodiment of the present invention. FIG. 9 is a perspective view of a main portion of the lower housing 170 according to the first exemplary embodiment of the present invention.

Referring to FIGS. 7 through 9, the LGP 141 further includes the LGP movement-preventing grooves 142.

The lower housing 170 further includes the LGP movement-preventing protrusions 1242 formed on the surface of the floor 172. The LGP movement-preventing protrusions 1242 are inserted into the LGP movement-preventing grooves 142, thereby preventing the movement of the LGP 141.

The LGP movement-preventing protrusions 1242 may be protruding parts fixed to the lower housing 170 or may be integrally formed on the lower housing 170 when the lower housing 170 is manufactured.

The LGP movement-preventing protrusions 1242 may also be formed on the heat-dissipating member 200. Here, at least some of the LGP movement-preventing protrusions 1242, which are adjacent to the LGP 141, may be made of a material with low thermal conductivity, so that heat of the point light sources 131 is not delivered to the LGP 141.

Upper surfaces of the LGP movement-preventing protrusions 1242 may not protrude further than the upper surface of the LGP 141.

The optical sheets 145 are disposed on the LGP 141 and include the optical sheet movement-preventing grooves 146. The optical sheet movement-preventing grooves 146 may overlap the LGP movement-preventing grooves 142, respectively.

The lower housing 170 further includes the optical sheet movement-preventing protrusions 1246 on the surface of the floor 172. The optical sheet movement-preventing protrusions 1246 are inserted into the LGP movement-preventing grooves 142 and the optical sheet movement-preventing grooves 146, thereby preventing the movement of the LGP 141 and the optical sheets 145.

The LGP movement-preventing grooves 142 and the optical sheet movement-preventing grooves 146 may be larger than diameters of the optical sheet movement-preventing protrusions 1246. In this case, a pad 300 may be interposed between the LGP 141 and the optical sheets 145 to prevent the inflow of foreign matter into the LGP movement-preventing grooves 142. The pad 300 may further include a pad groove 310 into which each of the optical sheet movement-preventing protrusions 1246 is inserted.

Figure 10:
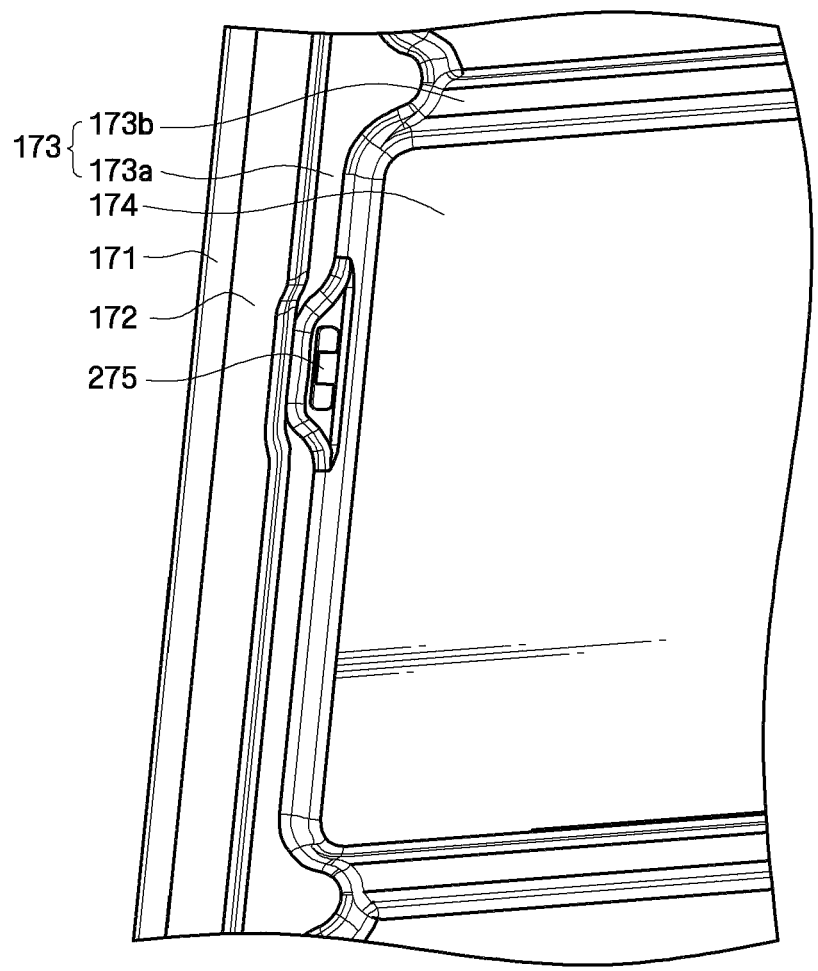
FIG. 10 is a schematic view showing the position of an electric wire-fixing portion according to the first exemplary embodiment of the present invention.
Figure 11:
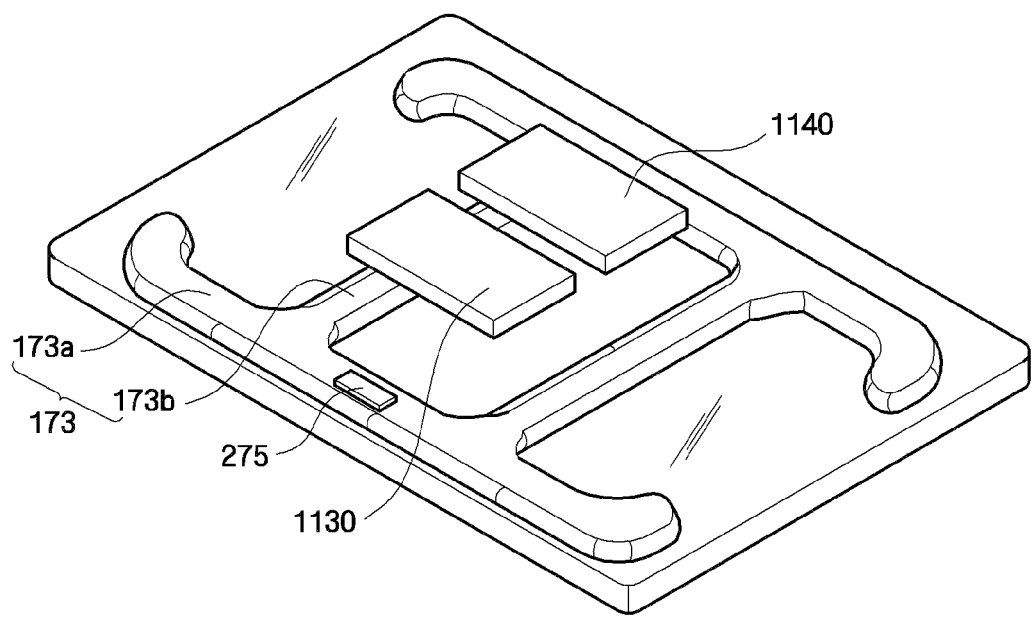
FIG. 11 is a bottom perspective view of the lower housing according to the first exemplary embodiment of the present invention.

Hereinafter, the structure of the lower housing 170 will be described in detail with reference to FIGS. 9 through 11. FIG. 9 is a perspective view of the main portion of the lower housing 170 according to the first exemplary embodiment of the present invention. FIG. 10 is a schematic view showing the position of an electric wire-fixing portion 275 according to the first exemplary embodiment of the present invention. FIG. 11 is a bottom perspective view of the lower housing 170 according to the first exemplary embodiment of the present invention.

Referring to FIGS. 9 through 11, the lower housing 170 includes the floor 172, the sidewalls 171 which are formed on the upper surface of the floor 172 to surround the floor 172, the concave embossed portion 173 which includes the long-side and short-side portions 173a and 173b and protrudes in a direction from the upper surface of the floor 172 toward a lower surface thereof, and a convex embossed portion 174 which is formed between the long-side and short-side portions 173a and 173b of the concave embossed portion and protrudes in an opposite direction to that of the concave embossed portion.

The heat-dissipating member 200 described above is placed on the floor 172, and the LGP movement-preventing protrusions 1242 and the optical sheet movement-preventing protrusions 1246 may also be placed on the floor 172.

The floor 172 and the sidewalls 171 formed along the edges of the floor 172 define a space for accommodating parts and protect the parts accommodated in the lower housing 170.

The concave embossed portion, which protrudes in the direction from the upper surface of the floor 172 to the lower surface thereof, prevents the lower housing 170 from warping.

When LEDs are used as the point light sources 131, heat generated by the LEDs is dissipated to the outside by the heat-dissipating member 200 (FIG. 1). However, some of the heat may be delivered to the lower housing 170. When the lower housing 170 is exposed to this heat, it may warp, thereby damaging parts accommodated therein. However, since the concave embossed portion causes part of the plate-shaped floor 172 of the lower housing 170 to have a three-dimensional shape, deformation of the floor 172 can be prevented.

To add rigidity to the lower housing 170, the concave embossed portion may include the long-side portions 173a which extend parallel to long sides of the lower housing 170 and the short-side portions 173b which branch off from the long-side portions 173a and extend parallel to short sides of the lower housing 170. Each of the short-side portions 173b and a corresponding one of the long-side portions 173a may form a "T" shape. Accordingly, the short sides 173b and a corresponding one of the long-side portions 173a may form a plurality of "T" shapes connected to each other.

The electric wires 135 (see FIG. 5) extending from the connector 132 (see FIG. 5) run through the concave embossed portion and are drawn out from the rear surface of the lower housing 170 through the electric wire outlet hole 175 formed in the concave embossed portion. That is, the concave embossed portion prevents the lower housing 170 from warping and provides a space for the electric wires 135.

The electric wire outlet hole 175 may be formed in a lowest embossed surface of the concave embossed portion that includes the long-side and short-side portions 173a and 173b. Specifically, the concave embossed portion may include the lowest embossed portion, which protrudes from the upper surface of the floor 172 to the lower surface thereof and is parallel to the floor 172, and an inclined embossed surface which connects the lowest embossed surface to the floor 172. The electric wire outlet hole 175 may be formed in the lowest embossed surface.

The electric wire-fixing portion 275 is inserted into the electric wire outlet hole 175. The electric wire-fixing portion 275 may be made of an elastic member such as rubber. Since the electric wires 135 can be inserted and fixed to the electric wire-fixing portion 275, defects, such as a short-circuit caused by the movement of the electric wires 135, can be prevented.

The electric wires 135 inserted into the electric wire-fixing portion 275 are bent along the inclined embossed surface and connected to a point light source-driving circuit board 1130. The bent electric wires 135 may be securely fixed to lower housing 170 using a fixing member, such as a tape.

The electric wire outlet hole 175 may also be formed in the inclined embossed surface. In this case, the electric wires 135 drawn out from the electric wire outlet hole 175 may be connected to the point light source-driving circuit board 1130 without being bent. When the electric wire outlet hole 175 is formed in the inclined embossed surface, an increase in the thickness of the LCD due to the electric wires 135 drawn out from the electric wire outlet hole 175 may more easily be prevented than when the electric wire outlet hole 175 is formed in the lowest embossed surface of the concave embossed portion. In addition, defects, such as short-circuits of the electric wires 135, may more easily be prevented.

The convex embossed portion 174 may be formed in each region defined by the long-side and short-side portions 173a and 173b of the concave embossed portion. That is, the convex embossed portion 174 may be formed between the long-side and short-side portions 173a and 173b of the concave embossed portion in a direction opposite to the direction in which the concave embossed portion protrudes.

The convex embossed portion 174 protrudes in a direction from the lower surface of the floor 172 to the upper surface thereof. Here, the distance between the floor 172 and the concave embossed portion may be greater than the distance between the floor 172 and the convex embossed portion 174.

The point light source-driving circuit board 1130 and a panel-driving circuit board 1140 may be mounted on a lower surface of the convex embossed portion 174. Since the point light source-driving circuit board 1130 and the panel-driving circuit board 1140 are mounted on the lower surface of the convex embossed portion 174, the thickness of the LCD need not be increased by thicknesses of the point light source-driving circuit board 1130 and the panel-driving circuit board 1140. Consequently, the thickness of the LCD can be reduced.

Figure 12:
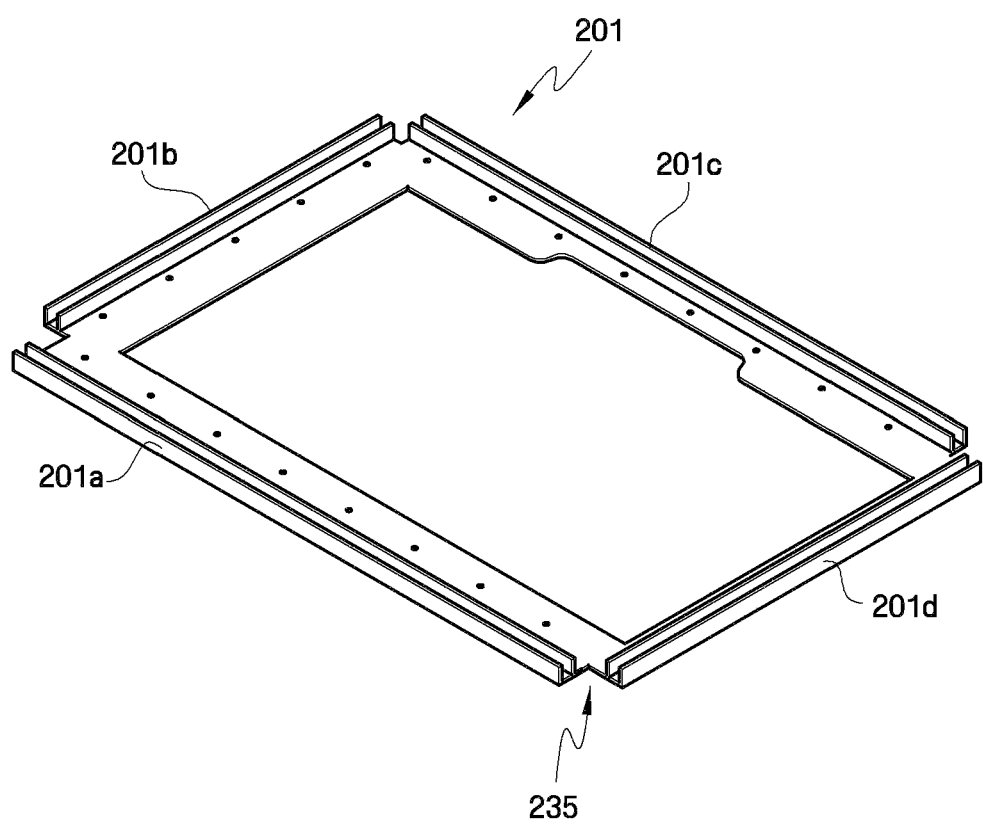
FIG. 12 is a perspective view of a heat-dissipating member according to a second exemplary embodiment of the present invention.
Figure 13:
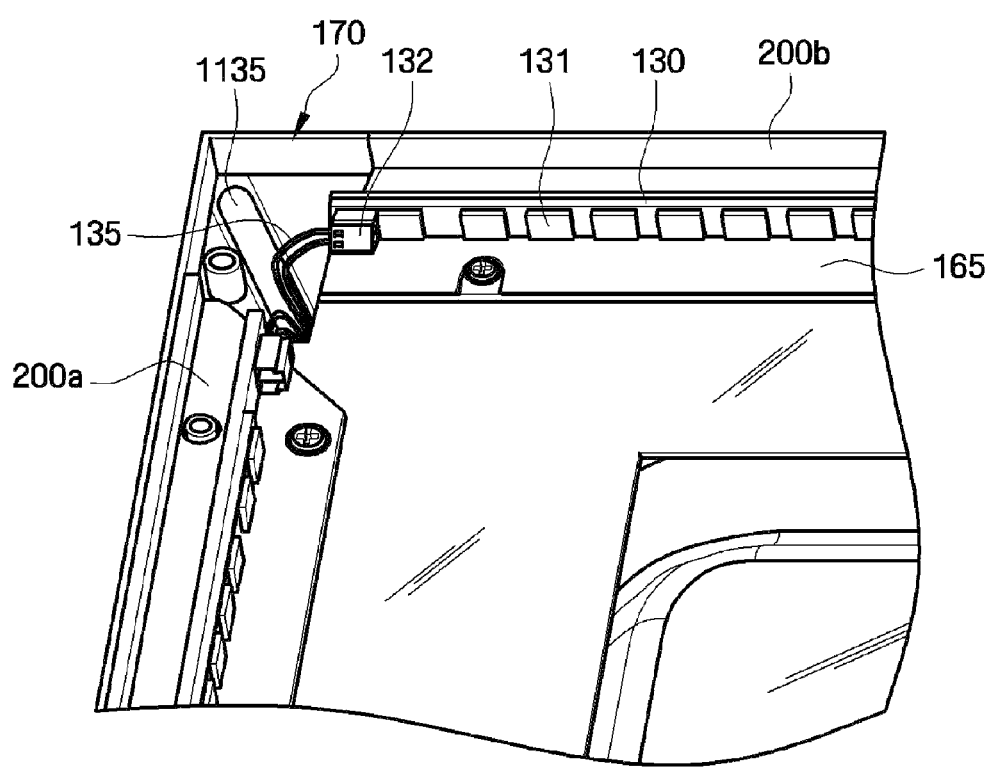
FIG. 13 is a perspective view showing the arrangement relationship between the heat-dissipating member and electric wires according to the second exemplary embodiment of the present invention.
Figure 14:
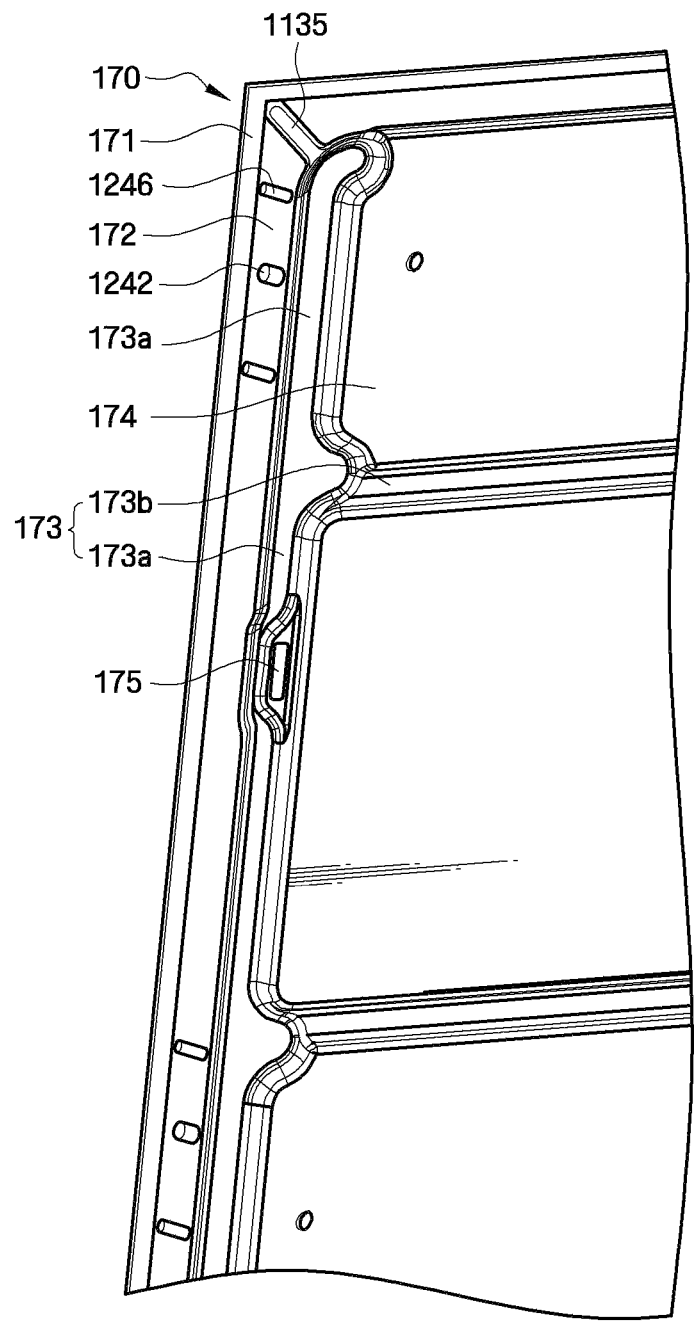
FIG. 14 is a partial perspective view of a lower housing according to the second exemplary embodiment of the present invention.

Hereinafter, an LCD according to a second exemplary embodiment of the present invention will be described in detail with reference to FIGS. 12 through 14. FIG. 12 is a perspective view of a heat-dissipating member 201 according to the second exemplary embodiment of the present invention. FIG. 13 is a perspective view showing the arrangement relationship between the heat-dissipating member 201 and electric wires 135 according to the second exemplary embodiment of the present invention. FIG. 14 is a perspective view of a main portion of a lower housing 170 according to the second exemplary embodiment of the present invention. Elements having the same functions as those according to the first exemplary embodiment of the present invention are indicated by like reference numerals, and thus their description will be omitted or simplified.

Referring to FIG. 12, the heat-dissipating member 201 according to the present embodiment may be shaped like a frame that is not partitioned. That is, the heat-dissipating member 201 according to the present invention may be formed as a single body along edges of the lower housing 170. For example, the heat-dissipating member 201 may be shaped like a rectangular frame having four sides. Here, four sides 201a through 201d of the heat-dissipating member 201 may have equal or different widths. An electric wire through recess 235, through which the electric wires 135 pass, is formed at each corner of the heat-dissipating member 201, where adjacent sides of the four sides 201a through 201d are joined.

Since the four sides 201a through 201d of the heat-dissipating member 201 according to the present embodiment are not separated from each other, there is no gap between them. Accordingly, the area of the heat-dissipating member 201 is increased, which, in turn, improves the heat dissipation effect.

An electric wire guide groove 1135 is formed in the lower housing 170. The electric wires 135 may be arranged parallel to each other in the electric wire guide groove 1135. A depth of the electric wire guide groove 1135 may be greater than a diameter of each of the electric wires 135.

The electric wire guide groove 1135 formed in the lower housing 170 does not substantially increase a thickness of the lower housing 170. Thus, the thickness of the LCD can be reduced as compared to when a separate space for the electric wires 135 is provided.

While the present invention has been particularly shown and described with reference to exemplary embodiments thereof, it will be understood by those of ordinary skill in the art that various changes in form and detail may be made therein without departing from the spirit and scope of the present invention as defined by the following claims. The exemplary embodiments should be considered in a descriptive sense only and not for purposes of limitation.

What is claimed is:

1. A liquid crystal display (LCD) comprising:
   a lower housing;
   a heat-dissipating member disposed in the lower housing;
   a plurality of point light sources disposed on the heat-dissipating member;
   a connecting portion adapted to supply power to the point light sources; and,
   a light guide plate (LGP) disposed in the lower housing such that at least one of side surfaces of the LGP face the point light sources,
   wherein the lower housing comprises a floor, at least one sidewall which is disposed on a first surface of the floor, and a concave embossed portion which protrudes in a direction from the first surface of the floor to a second surface of the floor.

2. The LCD of claim 1, wherein the connecting portion is extended along the concave embossed portion of the first surface of the floor, and is drawn out from the second surface of the floor.

3. The LCD of claim 2, further comprising an alignment board which face the side surfaces of the LGP, and on which the point light sources are mounted,
   wherein the concave embossed portion further comprises an outlet hole, and
   wherein the connecting portion is drawn out from an end of the alignment board, and pass through the outlet hole.

4. The LCD of claim 1, further comprising a fixing portion,
   wherein the concave embossed portion further comprises an outlet hole, and
   wherein the fixing portion is inserted into the outlet hole and fixes the connecting portion to the lower housing.

5. The LCD of claim 1, wherein the lower housing further comprises a convex embossed portion which is disposed between regions of the concave embossed portion and protrudes in an opposite direction to that of the concave embossed portion.

6. The LCD of claim 5, further comprising a driving circuit board which is disposed on a second surface of the convex embossed portion.

7. A liquid crystal display (LCD) comprising:
   a lower housing;
   a heat-dissipating member disposed in the lower housing;
   a plurality of point light sources disposed on the heat-dissipating member;
   a connecting portion adapted to supply power to the point light sources; and
   a light guide plate (LGP) disposed in the lower housing such that at least one of side surfaces of the LGP face the point light sources,
   wherein the lower housing comprises a floor, at least one sidewall which is formed on a first surface of the floor, and a convex embossed portion which protrudes in a direction from a second surface of the floor to the first surface of the floor.

8. The LCD of claim 7, further comprising a driving circuit board which is disposed on a second surface of the convex embossed portion.

9. A liquid crystal display (LCD) comprising:
   a lower housing;
   a heat-dissipating member having a plurality of unit heat-dissipating members which is disposed in the lower housing, a first unit heat-dissipating member and a second unit heat-dissipating member disposed adjacent to each other while defining an opening between the first and second unit heat-dissipating members;
   a plurality of point light sources disposed on the first unit heat-dissipating member;
   a connecting portion which is adapted to supply power to the point light sources, the connecting portion passing through the opening between the first and second unit heat-dissipating members; and
   a light guide plate (LGP) which is disposed in the lower housing such that at least one of side surfaces of the LGP face the point light sources,
   wherein the first unit heat-dissipating member comprises a heat-dissipating plate and a heat-dissipating support wall which extends substantially perpendicular to the heat-dissipating plate, and the point light sources are mounted on the heat-dissipating support wall.

10. The LCD of claim 9 wherein the first unit heat-dissipating member and the second unit heat-dissipating member are closest to one another at a location where the opening is defined as between them.

11. The LCD of claim 9, wherein the heat-dissipating plate is shaped like a trapezoid with two non-parallel sides.

12. A liquid crystal display (LCD) comprising:
   a lower housing;
   a heat-dissipating member having a plurality of unit heat-dissipating members which is disposed in the lower housing, a first unit heat-dissipating member and a second unit heat-dissipating member disposed adjacent to each other while defining an opening between the first and second unit heat-dissipating members;
   a plurality of point light sources disposed on the first unit heat-dissipating member;

a connecting portion which is adapted to supply power to the point light sources, the connecting portion passing through the opening between the first and second unit heat-dissipating members; and a light guide plate (LGP) which is disposed in the lower housing such that at least one of side surfaces of the LGP face the point light sources, wherein at least the first and second unit heat-dissipating members are integrally connected one to the next so as to define a single body having a continuum of such unit heat-dissipating members.

13. A liquid crystal display (LCD) comprising:

a lower housing;

a heat-dissipating member disposed in the lower housing;

a plurality of point light sources disposed on the heat-dissipating member;

a connecting portion adapted to supply power to the point light sources; and a light guide plate (LGP) which is disposed in the lower housing such that at least one of side surfaces of the LGP face the point light sources, wherein the lower housing comprises a floor, at least one sidewall which is disposed on a first surface of the floor, wherein the LGP further comprises an LGP movement-preventing groove, the lower housing further comprises a protrusion formed on the first surface of the floor, and the protrusion is inserted into the LGP movement-preventing groove, wherein the heat-dissipating member comprises a heat-dissipating plate and a heat-dissipating support wall which extends substantially perpendicular to the heat-dissipating plate, and the point light sources are mounted on the heat-dissipating support wall.

14. The LCD of claim 13, wherein the heat-dissipating member further comprises a protrusion through hole formed in the heat-dissipating plate, and wherein the protrusion is pass through the protrusion through hole.

15. A liquid crystal display (LCD) comprising:

a lower housing;

a heat-dissipating member disposed in the lower housing;

a plurality of point light sources disposed on the heat-dissipating member;

a connecting portion adapted to supply power to the point light sources; and a light guide plate (LGP) which is disposed in the lower housing such that at least one of side surfaces of the LGP face the point light sources, wherein the lower housing comprises a floor, at least one sidewall which is disposed on a first surface of the floor, wherein the LGP further comprises an LGP movement-preventing groove, the lower housing further comprises a protrusion formed on the first surface of the floor, and the protrusion is inserted into the LGP movement-preventing groove, wherein an upper surface of the protrusion does not protrude further than an upper surface of the LGP.

* * * * *